United States Patent
Zhang

(10) Patent No.: US 7,441,760 B2
(45) Date of Patent: Oct. 28, 2008

(54) WORK TABLE

(75) Inventor: Chong Yi Zhang, Suzhou (CN)

(73) Assignee: Chevron Limited, Hong Kong (HK)

( * ) Notice: Subject to any disclaimer, the term of this patent is extended or adjusted under 35 U.S.C. 154(b) by 0 days.

(21) Appl. No.: 11/901,583

(22) Filed: Sep. 18, 2007

(65) Prior Publication Data
US 2008/0067315 A1 Mar. 20, 2008

(30) Foreign Application Priority Data
Sep. 18, 2006 (CN) .................... 2006 2 0077984 U

(51) Int. Cl.
*B25B 1/02* (2006.01)
(52) U.S. Cl. ...................... 269/139; 269/130
(58) Field of Classification Search ................ 269/139, 269/130, 219–220, 136, 132, 900, 901, 125–127; 248/432
See application file for complete search history.

(56) References Cited
U.S. PATENT DOCUMENTS

| | | | |
|---|---|---|---|
| 4,061,305 A | 12/1977 | Beekenkamp | |
| 4,294,441 A * | 10/1981 | O'Banion et al. | 269/97 |
| 4,964,450 A | 10/1990 | Hughes et al. | |
| 5,584,254 A | 12/1996 | Williams | |
| 5,924,684 A * | 7/1999 | Cheng | 269/139 |
| 6,089,555 A * | 7/2000 | Lin | 269/139 |
| 6,149,145 A * | 11/2000 | Lin | 269/139 |
| 2008/0067315 A1* | 3/2008 | Zhang | 248/432 |

* cited by examiner

*Primary Examiner*—Lee D Wilson
(74) *Attorney, Agent, or Firm*—McDermott Will & Emery LLP

(57) ABSTRACT

The present invention discloses a work table mainly for supporting a cutting tool or a workpiece. The work table includes a support leg arrangement formed from a plurality of telescoping legs. A tool or workpiece bearing portion is mounted on the support leg arrangement. The bearing portion including a first bearing member and a second bearing member. At least one guide bar extends between the first and second bearing members. To permit movement, the first bearing member is movably arranged on the guide bar. The second bearing member is fixed relative to first bearing member by the support leg arrangement. The work table also includes a locking mechanism for securing the first bearing member relative to the second bearing member to define a use position. The locking mechanism, including a sleeve, a locking member, and a fixing member, is affixed to the guide bar between the first and second bearing members.

15 Claims, 3 Drawing Sheets

WORK TABLE

CROSS-REFERENCE TO RELATED APPLICATION

This application claims priority under 35 U.S.C. 119 to Chinese Application 200620077984.4, filed Sep. 18, 2006, and is hereby incorporated by reference

FIELD OF THE INVENTION

The present invention relates to a work table with movable bearing members for supporting a cutting device or workpiece. Specifically, the work table includes a locking means that secures the bearing members in a stable, use position.

BACKGROUND OF THE INVENTION

Conventional work tables generally comprise a support leg arrangement, that consists of telescoping rods, and an upper bearing portion mounted on the support leg arrangement, wherein the bearing portion includes two movable bearing members that are configured to support a cutting device, such as a saw, or workpiece, such as plywood.

U.S. Pat. No. 4,061,305 discloses a work table, which comprises a support leg arrangement and an upper bearing portion. The bearing portion includes two bearing members mounted on a base frame, where one of the two bearing members can be moved relative to another. The base frame and the bearing members mounted thereon can be detachably fixed on the support leg arrangement through the use of four elastic clips. A clamping means arranged between the frame and the movable bearing members can be actuated by a crank so as to effectuate the movement of the movable bearing member. This work table suffers from a number of limitations. First, the connection configuration between the support leg arrangement, the bearing portion, the base frame, and the elastic clips is overly complicated and susceptible to premature wear. Second, the clamping means is positioned between the movable bearing member and the base frame in obstructed position, which makes accessing and/or repairing the clamping means very difficult. In order for an operator to access the clamping means, the entire bearing member must be removed in a time consuming process.

The present invention seeks to overcome certain of these limitations and other drawbacks of the prior art work tables, and to provide new features not heretofore available. A full discussion of the features and advantages of the present invention is deferred to the following detailed description, which proceeds with reference to the accompanying drawings.

SUMMARY OF THE INVENTION

The present invention is directed to a work table with movable bearing members for supporting a cutting device or workpiece, and a securing means that retains the bearing portions in a stable, use position.

According to an aspect of the invention, the work table comprises a support leg arrangement and an upper bearing portion mounted on the support leg arrangement. The bearing portion includes a first bearing member and a second bearing member. At least one guide bar extends between the first and second bearing members, wherein the first bearing member is slidably arranged on the guide bar, and the second bearing member is fixed relative to the first bearing member by the support leg arrangement.

According to another aspect of the invention, the work table includes a locking means for securing the first bearing member relative to the guide bar in a stable use position. The locking means includes a locking member, a fixing member and an actuating member that structurally interact. One of the fixing member and the locking member is formed with a sloped surface. The locking means comprises a first state and a second state. In the second state, at least one portion of the locking member is engaged between the fixing member and the guide bar, and the actuating member is acted on the locking member upon which a force is applied to make it slide toward the guide bar along the direction of the slanted surface. With the arrangement of the work table, the bearing portion is directly mounted on the support leg arrangement without other intermediate connection members, which results in simple structure and convenient operation. Further, the locking means is accessible to the operator in the event repair or replacement becomes necessary.

BRIEF DESCRIPTION OF THE DRAWINGS

The present invention will be described in detail herein below by way of embodiments, with reference to the accompanying drawings.

DETAILED DESCRIPTION OF THE INVENTION

Figure 1:
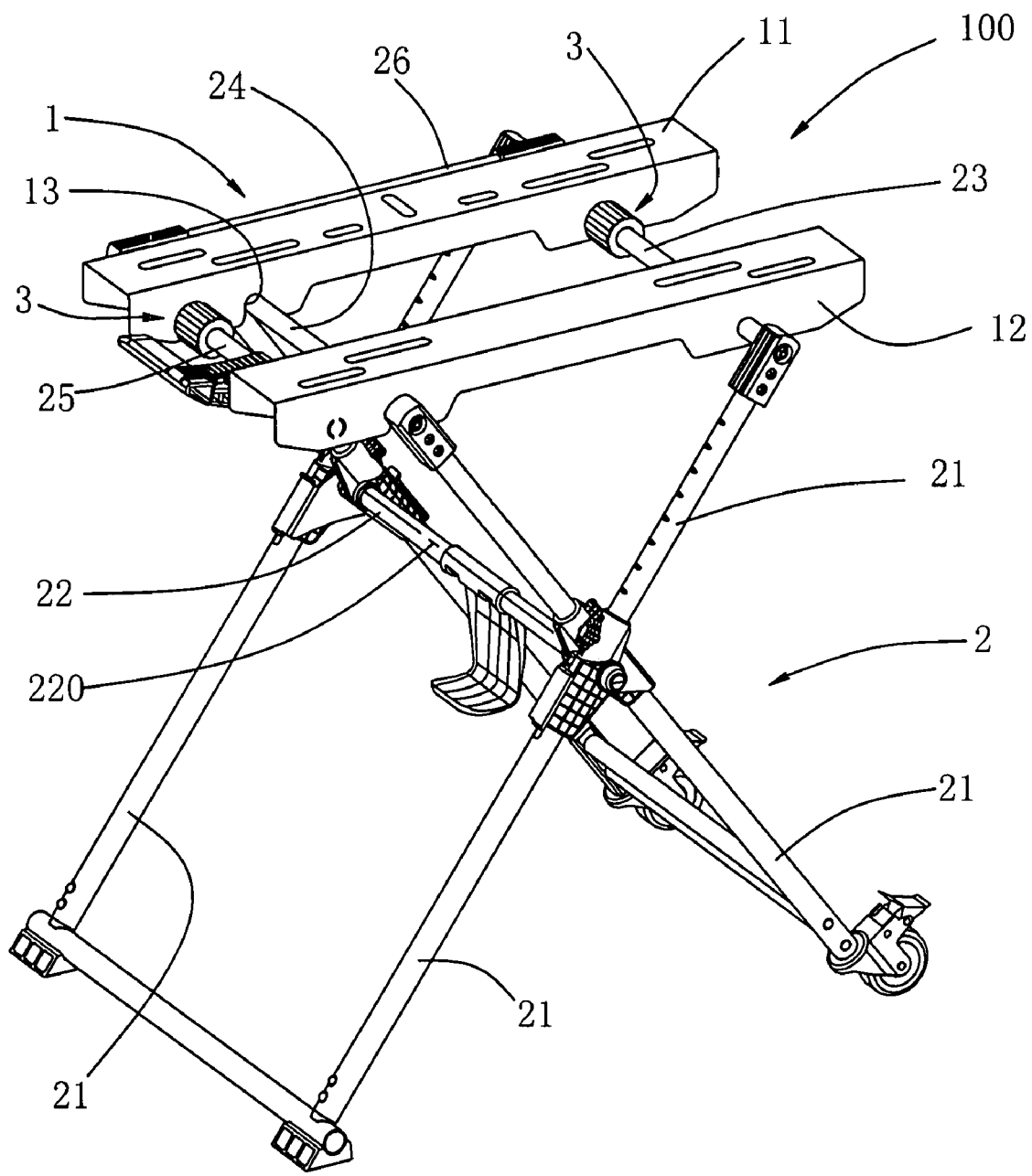
FIG. 1 is a perspective view of a work table of the present invention in a use position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

As shown in a use position of FIG. 1, a work table 100 comprises a bearing portion 1 upon which a cutting tool and/or workpiece is placed, and a support leg arrangement 2 on which the bearing portion 1 is mounted. The bearing portion 1 includes substantially parallel first bearing member 11 and second bearing member 12, each having an upper surface that resides in the same horizontal plane. The bearing members 11, 12 are elongated structural elements that engage and support the workpiece during use of the work table 100. The support leg arrangement 2 includes two pairs of telescopic rods or legs 21 that intersect to define an X configuration. A cross-member or connection rod 22 having a longitudinal axis 220 extends between intermediate portions of the crossed rods 21. Substantially parallel guide or slide bars 23, 24, 25 extend between the upper end of the rods 21.

In general terms, the first and second bearing members 11, 12 are joined to the guide or slide bars 23, 25 and the support leg arrangement 2. Preferably, the second bearing member 12 is stationary, and the first bearing member 11 is movably coupled on the guide bars 23, 25 and is movable relative to the second bearing member 12 in the direction of the connection rod axis 220. Thus, the first bearing member 11 can be moved towards and away from the second bearing member 12 depending upon the dimensions of the workpiece supported by the bearing members 11, 12. At least one cylindrical-surfaced engaging recess 13, having a diameter that slightly exceeds the diameter of the guide bar 24, is formed on each of the first and second bearing members 11, 12. Thus, the first and second bearing members 11, 12 mate with the guide bar 24 via the engaging recesses 13. A first end of the guide bar 25 extends through the first bearing member 11 and is connected with the guide bar 23 by an external rod 26 that runs substantially parallel with the first bearing member 11. These structural interactions increase the stability of the worktable 100.

Figure 2:
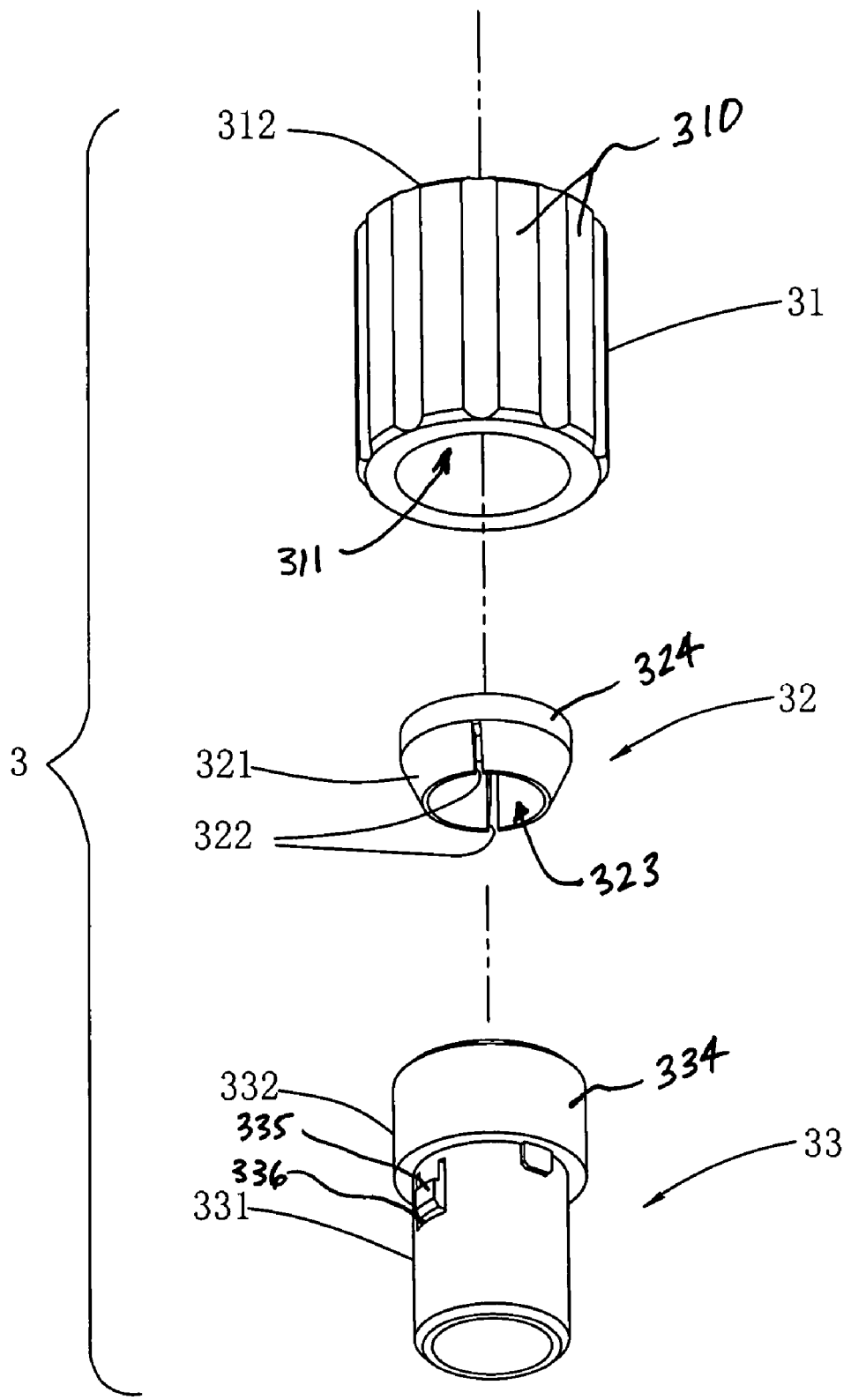
FIG. 2 is an exploded view of a locking means of the work table in FIG. 1.
Figure 3:
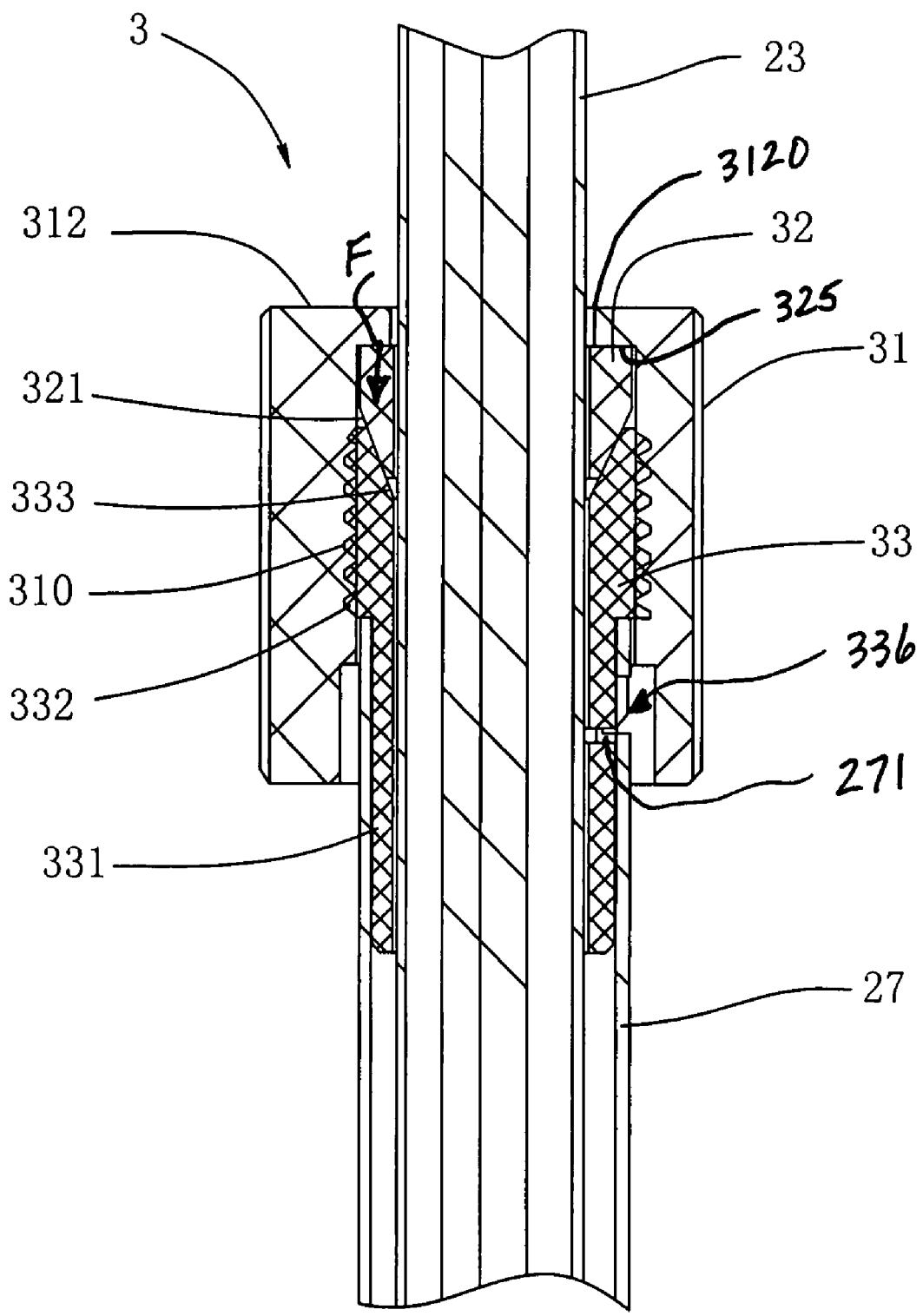
FIG. 3 is a longitudinal sectional view of the locking means in the use position of FIG. 1.

The bearing portion 1 further comprises at least one locking means 3 mounted to a guide bar 23, 24, 25 for locking or fixing the position of the movable first bearing member 11 relative to the second board 12 to arrive at the use position of FIG. 1. Specifically, the locking means 3 is affixed to at least one of the guide bars 23, 24, 25 between the first and second bearing members 11, 12. Referring to FIGS. 2 and 3, the locking means 3 includes an external actuating sleeve 31, an internal locking member 32 and a fixing sleeve 33. The external actuating sleeve 31 is substantially cylindrical and has internal threads 310, a central bore 311 and a cover segment 312. The cover segment 312 has an end wall 3120 that accommodates the central bore 311 which receives the guide bar 23, 25. Referring to FIGS. 2 and 3, the locking member 32 has a conical or sloped outer surface 321 with at least one gap or channel 322 extending from a central opening 323 and leading to a collar segment 324. Due to the conical surface 321, the locking member 32 has a wedge configuration, and the member 32 is preferably made of elastic material. Referring to FIG. 3, an end wall 325 of the locking member 32 engages and is retained by the end wall 3120 of the cover segment 312. A first end portion 331 of the cylindrical fixing sleeve 33 resides external to the sleeve 31 and is fixedly connected to a bushing 27 attached about the first bearing member 11. A second internal end 334 of the fixing sleeve 33 has outer threads 332 (see FIG. 3) which mate with the internal thread 310 of the actuating sleeve 31. The second end of the fixing sleeve 33 also includes a conical or sloped inner surface 333 that engages the conical surface 321 of the locking member 32 (see FIG. 3) in the use position. Referring to FIGS. 2 and 3, the fixing sleeve 33 includes a flexible finger 335 and recess 336 that receives a tab 271 of the bushing 27 in the use position. Alternatively, only one of the surfaces 321, 333 has a sloped configuration.

Once an operator has moved the first bearing member 11 along the guide bars 23, 25 to the desired position, the locking means 3 is utilized to secure the board 11 in the use position. Specifically, the operator moves the actuating sleeve 31 towards the locking member 32 and the fixing sleeve 33, and then rotates the sleeve 31 in a first direction about the guide bar 23 to facilitate engagement between the internal threads 310 and the outer threads 332. The rotation of the sleeve 31 continues until the threads 310, 332 are fully engaged, which causes the end wall 3120 of the cover segment 312 to contact the end wall 325 of the locking member 32. As the cover segment 312 contacts the locking member 32, the sleeve 31 imparts a driving force F upon the locking member 32. The driving force F drives the locking member 32 into secured engagement with the fixing sleeve 33, which is rigidly secured to the bushing 27. Consequently, the conical surface 321 of the locking member 32 slides (downward in FIG. 3) along the conical inner surface 333 of the fixing sleeve 33 in a "wedging effect" that secures and stabilizes the locking member 33 and the fixing sleeve 33 within the locking member 32 in the use position of FIGS. 1 and 3. Therefore, the locking member 32 and the fixing sleeve 33 are bound or stressed against the guide bars 23, 25 (see FIG. 3), so that the first bearing member 11 is secured in the desired use position relative to the second bearing member 12. Due to the rotation of the actuating sleeve 31, the gaps 322 of the locking member 32 are contracted.

To release the locking means 3 to allow for adjustment of the first bearing member 11, the actuating sleeve 31 is rotated in a second direction about the guide bar 23 such that the internal threads 310 disengage the external threads 332, which releases the force applied by the sleeve 31 upon the locking member 32. Once released, the locking member 32 moves away from the fixing sleeve 33 as the conical surface 321 of the member 32 guides along the conical surface 333 of the fixing sleeve 33. This permits the sleeve 31 to be disengaged from the locking member 32 and frees the locking member 32 within the cover segment 312. Consequently, the stress on the member 32 is released and the gaps 322 revert to their original form. Once these releasing steps are performed, the first bearing member 11 can be adjusted on the guide bars 23, 25. The actuating sleeve 31 may include ridges or a textured outer surface 310 (see FIGS. 1 and 2) to facilitate rotation of the sleeve 31 and use of the locking means 3.

In a second embodiment, each of the guide bars 23, 25 comprise two rods telescopically connected together. As explained above, the first bearing member 11 is fixed to one of the rods and the second bearing member is fixed to the other rod. The locking means 3 is arranged and interacts with the two rods to fix or release the telescopic rods. Thus, both the first bearing member 11 and one of the telescopic rods may be moved towards or away from the other rod and the second bearing member 12.

The work table 100 disclosed in the present invention is not intended to be limited to the structure described in the above paragraphs and drawings. For example, the locking member 32 of the locking means 3 may include only one or more than two gaps 322. If the locking member 32 includes only one gap, the gap may be extended to the other end of the locking member 32. Any obvious variations, substitutions or modifications based on the present invention will be regarded as within the protective scope of the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A work table for use in supporting a cutting tool, the work table comprising:
   a support leg arrangement;
   a bearing portion mounted on said support leg arrangement, the bearing portion including a first bearing member and a second bearing member;
   at least one guide bar extending between said first and second bearing members, wherein said first bearing member is movably arranged on said guide bar, and said second bearing member is fixed relative to said support leg arrangement;
   a locking means for securing the position of said first bearing member relative to said second bearing member, said locking means affixed to said guide bar between said first and second bearing members, said locking means comprising a generally cylindrical sleeve, a locking member, and a fixing member which wraps around the guide bar, and, wherein the fixing member has a second end that resides within the sleeve, the second end having a sloped surface.

2. The work table of claim 1, wherein the locking member has a sloped surface that slidingly engages the sloped surface of the fixing member during use of the locking means.

3. The work table of claim 2, wherein an end wall of the locking member engages an end wall of the sleeve during use of the locking means.

4. The work table of claim 2, wherein during rotation of the sleeve to move the sleeve towards the fixing member, the sleeve imparts a force upon the locking member to bring it into engagement with the fixing member.

5. The work table of claim 1 wherein the fixing member has a plurality of external threads that mate with a plurality of internal threads of the sleeve.

6. A work table comprising:
   a support leg arrangement;
   a first bearing member and a second bearing member, both mounted on said support leg arrangement;
   at least one guide bar extending between said first and second bearing members, wherein said first bearing member is movable relative to the second bearing member along said guide bar;
   a locking mechanism that secures the position of said first bearing member relative to said second bearing member, said locking mechanism comprising a sleeve, a locking member residing within said sleeve, and a fixing member that wraps around said guide bar; and,
   wherein during operation of said locking mechanism, said sleeve is moved towards said fixing member and said sleeve imparts a driving force upon said locking member to bring it into engagement with said fixing member.

7. The work table of claim 6, wherein the locking member has a sloped surface that engages the fixing member as the sleeve imparts the drive force on the locking member.

8. The work table of claim 7, wherein the fixing member has a second end residing within the sleeve and having a sloped surface, wherein the sloped surface of the locking member slidingly engages the sloped surface of the second end of the fixing member.

9. The work table of claim 8, wherein the fixing member has a plurality of external threads that mate with a plurality of internal threads of the sleeve to operably couple the sleeve and fixing member.

10. The work table of claim 8, wherein an end wall of the locking member opposite the sloped surface engages an end wall of the sleeve during use of the locking means.

11. The work table of claim 6, wherein said fixing member is positioned between the guide bar and the sleeve whereby the sleeve is external to both the fixing member and the guide bar.

12. The work table of claim 11, wherein said fixing member is secured to the guide bar by a bushing affixed to the guide bar, and the fixing member has a first end that resides external to the sleeve, the first end having a recess that receives a tab of the bushing.

13. A work table comprising:
   a support leg arrangement;
   a bearing portion mounted on said support leg arrangement, the bearing portion including a first bearing member and a second bearing member;
   a plurality of guide bars extending between said first and second bearing members, wherein said first bearing member is movably arranged on said guide bars, and said second bearing member is fixed relative to said support leg arrangement; and,
   a locking mechanism affixed to one of said guide bars to secure the position of said first bearing member relative to said second bearing member, said locking mechanism comprising a sleeve, a locking member residing between said sleeve and said guide, and a fixing member that wraps around said guide bar and residing between said sleeve and said guide member; and,
   wherein in a use position, said sleeve imparts a driving force upon said locking member to bring it into engagement with said fixing member to secure said locking mechanism.

14. The work table of claim 13, wherein the locking member has a sloped surface and wherein the fixing member has a sloped surface residing within the sleeve, and,
   wherein as a result of the driving force, the sloped surface of the locking member slidingly engages the sloped surface of the fixing member.

15. The work table of claim 14, wherein the fixing member has a plurality of external threads that mate with a plurality of internal threads of the sleeve to operably couple the sleeve and fixing member, and wherein rotation of the sleeve provides the driving force imparted on the locking member.

* * * * *